United States Patent Office 2,877,873
Patented Mar. 17, 1959

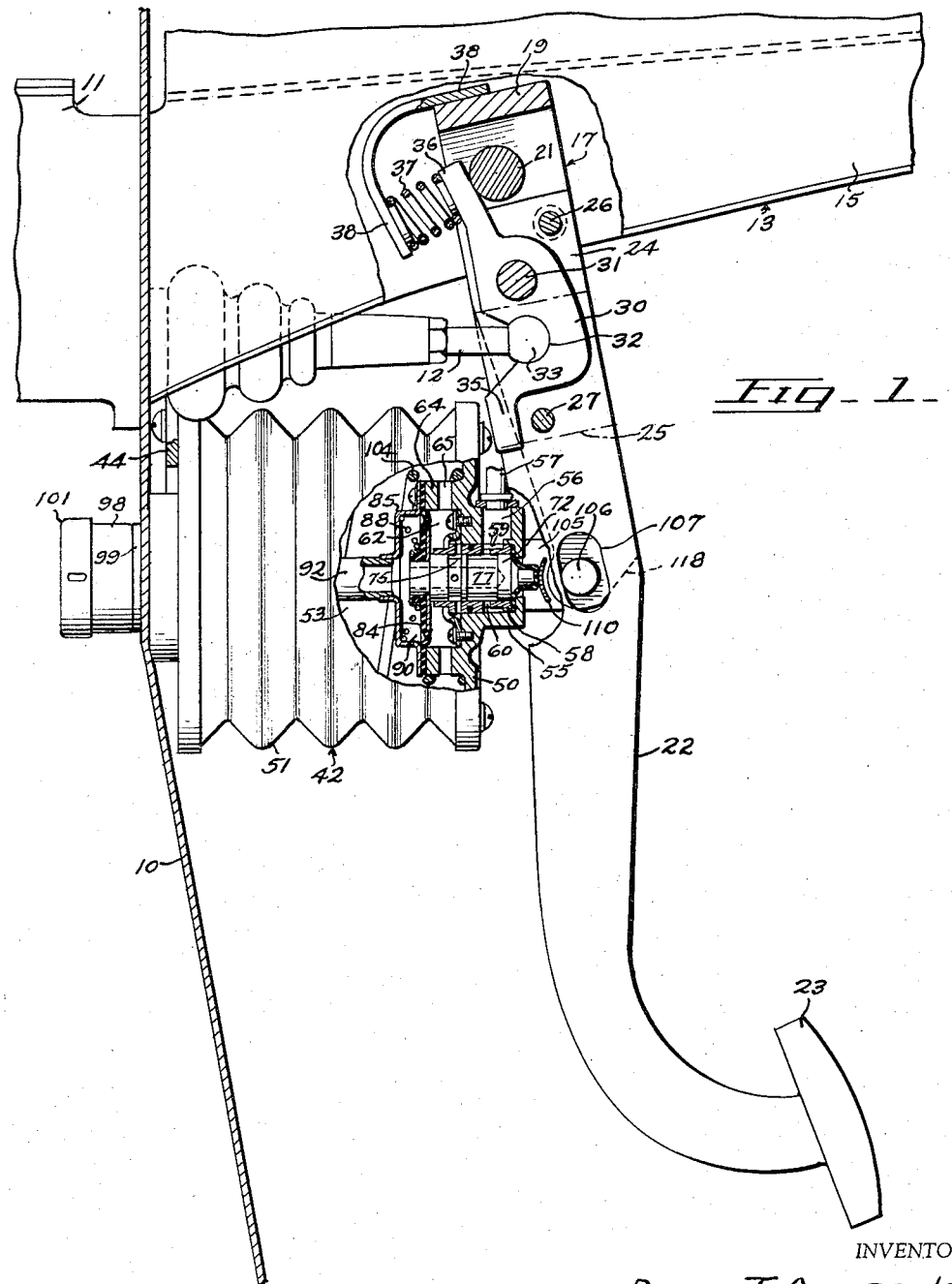

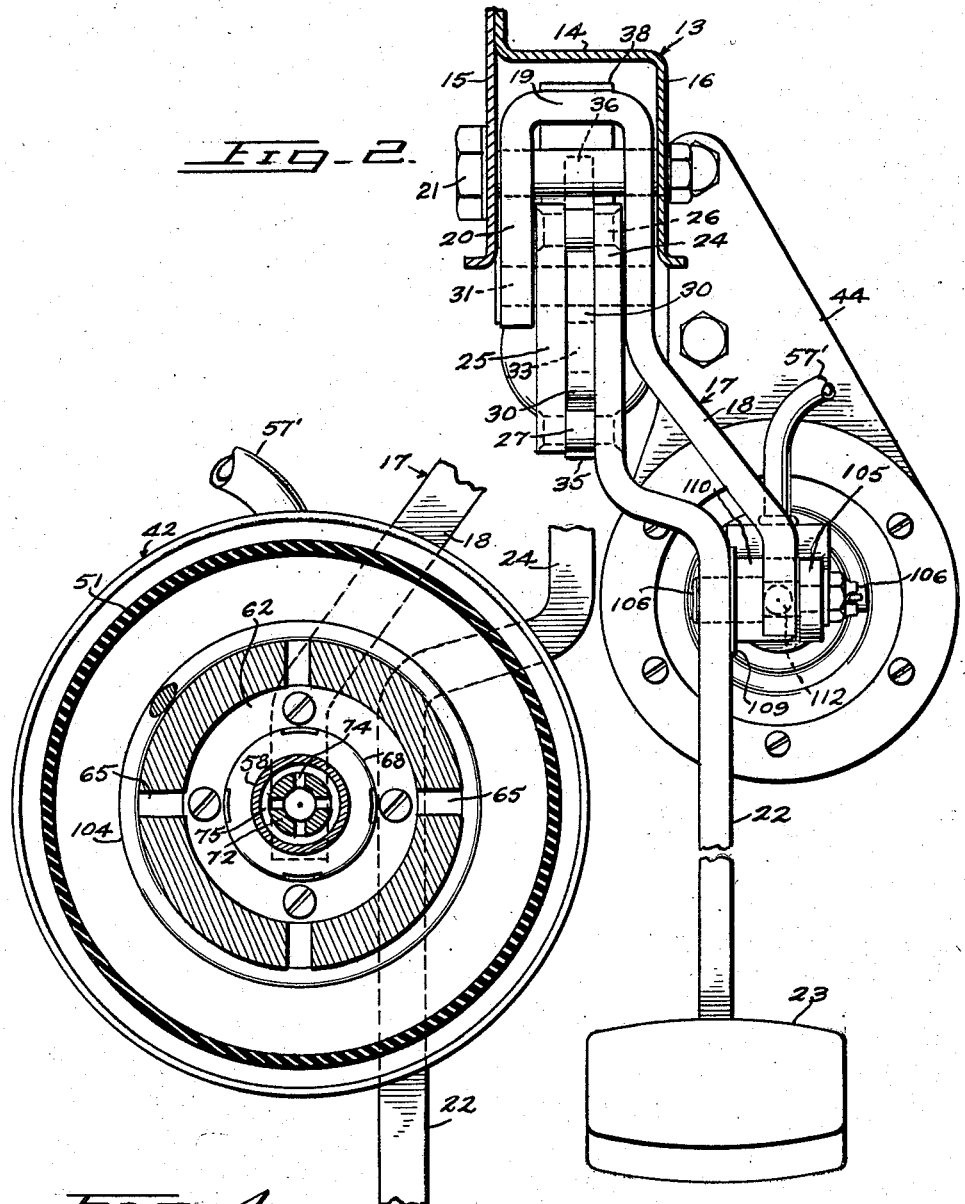

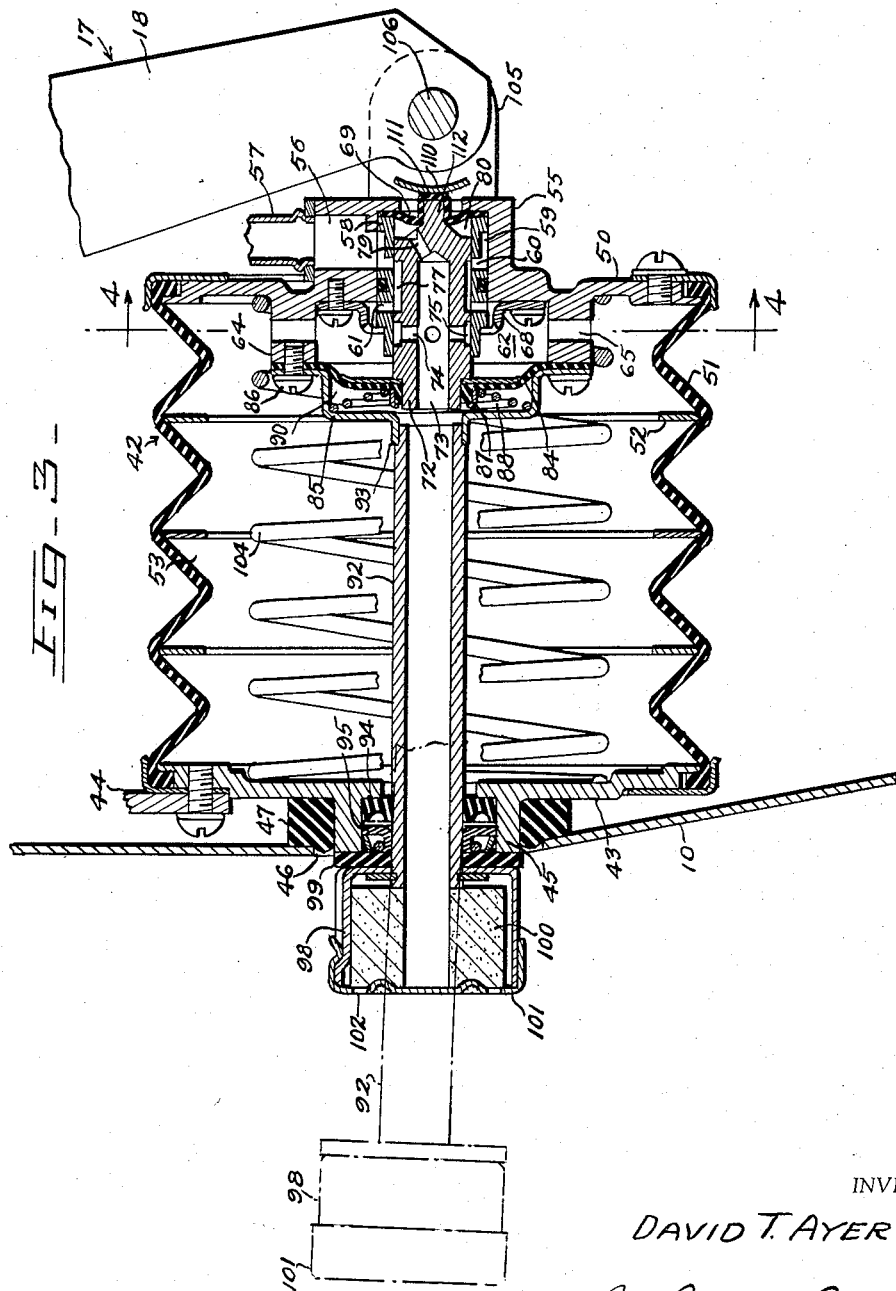

2,877,873

BOOSTER BRAKE MECHANISM

David T. Ayers, Jr., Birmingham, Mich., assignor to Kelsey-Hayes Company, a corporation of Delaware Application February 15, 1955, Serial No. 488,185

5 Claims. (Cl. 188—152)

This invention relates to a booster brake mechanism and is an improvement over the structures disclosed in the copending applications of Jeannot G. Ingres, Serial No. 463,492, filed October 20, 1954, and Serial No. 488,258, filed February 15, 1955.

In the first-mentioned copending application referred to above, there is shown a bellows type motor for applying power to assist the operator in effecting movement of the master cylinder piston. A lever mechanism is employed comprising a pedal lever and a power lever, and unlike prior constructions, the power lever rather than the pedal lever is pivoted for turning movement on a fixed axis. The pedal lever is pivoted to the power lever for turning movement on an axis which provides a greater lever ratio for effecting initial movement of the master cylinder piston upon initial operation of the brake pedal, thus reducing the force which must be applied to the brake pedal to initially move the piston. Such initial movement of the brake pedal effects operation of the valve mechanism for the booster motor to render the latter operative for the power actuation of the power lever, and the pivot pin providing the connection between the pedal lever and the power lever turns about the fixed supporting axis for the power lever, thus providing for the necessary distance of movement of the master cylinder piston to displace an ample supply of hydraulic fluid for each complete brake application.

While the structure of the copending application discussed above is definitely advantageous over prior similar arrangements, it still requires the operator to exert against the pedal pad a force greater than that which is desirable in the initial operation of the pedal lever. This resistance is due to the fact that initial movement of the pedal lever transmits positive movement to the master cylinder piston.

In the other copending application referred to above, Serial No. 488,258, the resistance to initial movement of the pedal pad is eliminated through the use of a rocker interposed between the pedal lever and power lever and connected to the push rod for the master cylinder piston. This rocker is biased to a normal position in which it has lost motion connection with the pedal lever when the latter is in normal off position, and accordingly the pedal lever is initially movable from its off position to move the motor valve mechanism and effect energization of the motor without transmitting movement to the master cylinder piston, thus providing an extremely "soft" pedal. As a matter of fact, the pedal in such mechanism is "softer" than is desired by many motor vehicle operators, such operators having the feeling upon initial operation of the brake pedal that the pedal pads are falling away from their feet.

An important object of the present invention is to provide a novel booster brake mechanism wherein all of the advantages of the structures of the two copending applications referred to are retained, but wherein too great a degree of softness in the brake pedal is eliminated by providing an initial extremely limited, but progressively increasing, resistance to the brake pedal as the latter is moved from its normal off position.

A further object is to provide in combination with a lever mechanism of the type referred to above, a booster motor having means therein responsive to the degree of energization of the motor for resisting movement of the brake pedal from normal off position with an initially extremely low resistance which progressively increases at least to the point where the rocker referred to above comes into operation to react against the brake pedal, thus not only eliminating an excessive degree of softness in the brake pedal but also preventing the rocker from becoming too suddenly effective for resisting movement of the brake pedal.

A further object is to provide an improved structure of the character referred to wherein the motor structure is improved by utilizing a bellows type motor in the driver's compartment of the vehicle and having a stationary motor head fixed to the fire wall, and by supplying air to the motor through an air cleaner arranged forwardly of the fire wall, thus silencing the admission of air to the motor and facilitating in an extremely simple manner the maintenance under atmospheric pressure of one side of the diaphragm which is employed for the progressive resisting of initial movement of the brake pedal from its normal off position.

Other objects and advantages of the invention will become apparent during the course of the following description.

In the drawings I have shown one embodiment of the invention. In this showing:

Figure 1 is a side elevation of the apparatus, the fire wall of the vehicle being shown in section and parts of the motor being broken away;

Figure 2 is a rear face view of the apparatus, the supporting bracket being shown in section;

Figure 3 is an enlarged axial sectional view through the motor and associated elements;

Figure 4 is a section on line 4—4 of Figure 3; and

Figure 5 is a detail perspective view of the spool valve.

Referring particularly to Figure 1, the numeral 10 designates a conventional motor vehicle fire wall forwardly of which is arranged a master cylinder 11 having a conventional plunger (not shown) operable by a rearwardly extending rod 12. The master cylinder, of course is carried by the fire wall 10 and such wall also supports a rearwardly extending supporting bracket 13 of generally inverted U section (Figure 2) and comprising a top wall 14 and opposite parallel side walls 15 and 16.

A bolt 21 extends through the bracket 13 and forms a fixed supporting pivot for a power lever indicated as a whole by the numeral 17. This lever is of inverted J shape and comprises a relatively long depending arm 18, a laterally extending preferably integral top portion 19 and a shorter integral depending arm 20 spaced from and parallel to the upper portion of the arm 18.

A pedal lever indicated as a whole by the numeral 22 is provided at its lower end with a conventional pedal pad 23 and has its upper end 24 arranged inwardly of and adjacent the upper end of the lever arm 18. A plate 25, preferably shaped similar to the upper end 24 of the pedal lever, is spaced from such portion of the pedal lever and arranged adjacent the arm 20. The plate 25 and upper lever end 24 are fixed in spaced relation to each other by upper and lower rivets 26 and 27.

A rocker 30 is arranged between the plate 25 and upper lever end 24 and the latter elements and the rocker 30 are pivotally connected to the power lever by a pivot pin 31 passing through the power lever arms 18 and 20. The rocker 30 is provided with a recess 32 formed as a section of a cylinder and receiving a correspondingly shaped head 33 carried by the push rod 12. The rocker is provided with a depending finger 35 normally spaced from the rivet 27 when the parts are in the normal off positions shown in Figure 1, the rivet 27 serving as a stop for the finger 35 in a manner to be described. The upper end of the rocker is provided with a finger 36 normally seating against the pivot pin 21 and engaged by one end of a compression spring 37. The other end of this spring bears against a bracket 38 welded or otherwise secured at its upper end to the top portion 19 of the power lever. The spring 37 biases the rocker 30 for clockwise turning movement about the pivot pin 31 to the position shown in Figure 1.

The power lever 17 is operable by a motor indicated as a whole by the numeral 42. The motor 42 comprises a stationary head 43 (Figure 3) fixed to a stationary depending bracket 44 secured in any suitable manner to the fire wall 10. The stationary wall 43 is provided with a forwardly extending annular flange 45 having its forward extremity mounted in an opening 46 in the fire wall 10 and cushioned with respect to the fire wall as at 47.

The motor further comprises a pressure movable head 50 spaced from the fire wall rearwardly thereof. A bellows 51 is connected between the motor heads and is preferably provided with subtending rings 52 to prevent the radial collapsing of the bellows when vacuum is present in the motor chamber 53 within the bellows.

The motor head 50 carries as an integral part thereof an axial valve housing 55 having a port 56 communicating with a nipple 57 adapted for connection with a flexible hose 57' leading to the intake manifold of the motor vehicle engine as the preferable source of vacuum for operating the motor. The valve housing is provided therein with a sleeve 58 having an external annular groove 59 in fixed communication with the vacuum port 56, and the sleeve is provided therethrough with radial ports 60 communicating with the groove 59. The sleeve 58 is provided in spaced relation to the ports 60 with additional radial ports 61 opening into a chamber 62 in a rearwardly extending annular flange 64 formed integral with the motor head 50. This flange is provided with ports 65 affording fixed communication between the chamber 62 and the motor chamber 53.

The sleeve 58 is maintained in position by a clip 68 which holds the sleeve 58 in its rearward limit of movement in clamping engagement with the peripheral portion of a diaphragm 69 for a purpose to be described.

A spool valve 72 is slidable in the sleeve 58 and is provided with an axial bore 73 communicating through ports 74 with an external groove 75 normally communicating with the sleeve ports 61 and movable out of registration therewith when the motor is energized. The positions of the parts upon initial energization of the motor are shown in Figure 3.

The sleeve valve is further provided with an external axially elongated groove 77 in fixed communication with the port 60 and out of communication with the ports 61, and movable to a position, as in Figure 3, connecting the ports 60 and 61.

As further described below, the axial bore 73 is in fixed communication with the atmosphere and this bore communicates through port 79 with a chamber 80 back of the diaphragm 69, thus maintaining such chamber at atmospheric pressure. A reaction diaphragm 84 has its peripheral portion clamped against the forward edge of the flange 64 by a sheet metal cap 85 secured to the flange 64 by screws 86. The inner edge of the diaphragm 84 is fixed to the valve 72 as at 87, and a spring 88 is interposed between the cap 85 and diaphragm 84 to urge the valve 72 rearwardly to its normal motor de-energizing position. It will be apparent that the rear face of the diaphragm 84 is always subject to pressure present in the chamber 62. The forward face of the diaphragm is always subject to atmospheric pressure, in a manner to be described, in the chamber 90, formed in the cap 85. An axial tube 92 is welded or otherwise secured at its rear end to a cylindrical flange 93 carried by the cap 85. The tube 92 extends through the stationary motor wall 43 and such wall is provided with a deformable double-lipped seal 94 backed up preferably by a rawhide or other deformable seal 95, these seals permitting the tube 92 to alter its position axially of the head 43 during operation of the motor, as will become apparent.

Forwardly of the fire wall 10, the tube 92 carries a preferably stamped casing 98 to which is secured a bumper 99 engageable with the forward end of the flange 45. This bumper, as will become apparent, limits rearward movement of the tube 92 and the elements connected thereto, and silences the arresting of the parts in such normal positions. The casing 98 houses an air cleaner 100 and is provided with a cap 101 apertured as at 102 for the admission of air into the air cleaner. A heavy return spring 104 engages at opposite ends with the motor heads 43 and 50 to urge the head 50 and tube 92 to the normal off positions referred to.

The valve housing 55 is provided with a rearwardly extending ear 105 pivotally connected by a bolt 106 to the lower end of the power lever arm 18. This pin also extends through a slot 107 formed in the pedal lever 22 to provide lost motion connection between the pedal lever and the pin 106. The left-hand side of the slot 107, in the off positions of the parts shown in Figure 1, engages the pin 106, and the pedal lever is movable an appreciable distance from its normal off position independently of the pin 106. The pedal lever 22 carries a disk 109 through which the slot 107 extends, and this disk is provided with a preferably integral lateral extension 110 extending across and engageable with the central portion 111 of the diaphragm 69, such portion of the diaphragm covering a projecting button 112 formed integral with the valve 72. Such central portion 111 of the diaphragm silences engagement of the projection 110 with the valve, and such projection is operative for moving the valve to energize the motor upon operation of the brake pedal.

Operation

The parts normally occupy the positions shown in Figure 1, the valve groove 77 being moved to the right (Figure 1) of the ports 61 and these ports being open to the atmosphere through the valve ports 74, tube 92 and air cleaner 100. Accordingly, atmospheric pressure will be present in the motor chamber 53. At the same time, the upper finger 36 of the rocker 30 will be in engagement with the pivot pin 21, while the lower finger 35 will be spaced to the left of the rivet 27.

The brakes are applied in the usual manner through operation of the operator's foot on the pedal pad 23. The pedal lever 22 is pivoted on the pin 31 carried by the power lever 17. When the pedal lever is initially operated, therefore, such lever will turn about the axis of the pin 31 and the transverse member 110 will move the valve 72 to the left as viewed in Figures 1 and 3. This operation moves the valve groove 75 out of registration with the ports 61 and moves the groove 77 to a position cracking the ports 61 to the vacuum chamber 56. The chamber 53 of the motor will now be cut off from the atmosphere and will be connected to the source of vacuum, whereupon atmospheric pressure moves the head 50 of the motor toward the left. This movement of the motor head 50 is transmitted to the power lever through the pin 106 and this lever will now start to turn about the axis of its supporting pin 21.

When the parts were in their off positions, atmospheric pressure will have existed in both diaphragm chambers 62 and 90, and the only force tending to move the valve 72 to its off position will have been the force of the light return spring 88. Initial movement of the pedal lever, therefore, takes place solely against the loading of the light spring 88 and the pedal lever will turn about the axis of the pin 31, this pin momentarily remaining stationary. As soon as the sleeve ports 61 are cracked to the vacuum chamber 56, however, differential pressures will be set up on opposite sides of the diaphragm 84 and movement of the valve 72 will be resisted by the tension of the light spring 88 plus the differential pressures affecting the diaphragm 84, such differential pressure initially being light and progressively increasing as air is evacuated from the chamber 62 and the motor chamber 53.

It will be apparent, therefore, that only the very first increment of movement of the brake pedal will be resisted solely by the spring 88 and any feeling that the brake pedal is falling away from the operator's foot will be promptly prevented by the initial establishment of differential pressures in the diaphragm chambers 62 and 90. In this connection it is pointed out that it is highly desirable to eliminate the necessity for the operator's having to move the master cylinder plunger through the effort of foot pressure since it requires appreciable force on the part of the operator. With prior constructions, this necessity for displacing fluid by the effort of the operator's foot caused a lumpiness in the brake operation which is eliminated by the lever mechanism shown in the copending application of Jeannot G. Ingres, Serial No. 488,258, referred to above. The present construction utilizes the rocker 30 similar to the rocker of the copending application just referred to, and the lost motion between the finger 35 and pin 27 permits initial movement of the brake pedal without transmitting movement to the master cylinder plunger. The prior construction is objectionable to many operators, however, because of the almost total absence of any resistance to pedal lever movement in the initial stages of brake operation.

The disadvantage referred to is overcome in the present construction since the differential pressures affecting the diaphragm 84 come into play prior to engagement of the finger 35 with the pin 27, as further referred to below, and accordingly the operator in the initial stages of brake operation will encounter increasing resistance to pedal movement. This resistance, of course, is progressive without providing any lumpiness, and the pedal lever accordingly is provided with a highly desirable "softness" without being too freely operable. In the structure of the copending application just referred to, the initial stages of brake pedal lever movement take place against negligible resistance as stated, until play is taken up between the rocker corresponding to the rocker 30 and the pedal lever, whereupon the operator feels an appreciable increase in pedal resistance. The same resistance is encountered in the present construction upon engagement of the finger 36 with the rivet 27. However, the increase in pedal resistance is not sudden since the progressive building-up of the resistance due to the reaction of the diaphragm 84 reaches the point where engagement between the finger 35 and rivet 27 is hardly noticed. Thus the diaphragm reaction acts in combination with the rocker 30 to provide a smooth progressive resistance which is highly desirable.

As previously stated, energization of the motor moves the head 50 which transmits movement through the ear 105 and pin 106 to the power lever 17. As soon as this lever starts to move about the axis of its supporting pin 21, the pin 31 will partake of similar movement since it is carried by the power lever. With the rocker 30 remaining for the time being in a position with its finger 36 engaging the pin 21 so that the rocker moves bodily with the power lever, force will be applied through the head 33 to the rod 12 to effect movement of the master cylinder plunger. The spring 37 is so tensioned as to prevent counterclockwise turning movement of the rocker 30 when the latter initially imparts movement to the rod 12. The spring 37 may be so designed as to be overcome by any desired reaction pressure in the master cylinder, and when such pressure is reached, the reaction forces acting through the rod 12 and head 33 will start to turn the rocker counterclockwise about its pivot pin 31, against the tension of the spring 37. This operation moves the finger 35 into engagement with the rivet 27. Thereafter, the operator will apply force to the rocker 30 through the rivet 27, while the power lever will apply force to the rocker through the pivot pin 31. These two forces combine to effect movement of the master cylinder piston, as will be apparent.

The foregoing operations in applying the brakes take place with the pin 106 arranged out of contact with the right-hand edge of the slot 107. As the brake pedal is initially operated to energize the motor, the left-hand side of the slot 107 moves away from the pin 106 and this pin will remain out of engagement with both sides of the slot 107 up to the point of power "run-out" in the motor, that is, the point at which the motor is energized to its maximum extent. This point occurs prior to the point of maximum brake application. Beyond the point of power run-out, the right-hand side of the slot 107 will move into engagement with the pin 106, and further application of foot pressure against the pedal pad 23 will cause the pedal lever 22 to assist the motor in transmitting forces to the power lever through the pin 106.

The brakes are released by releasing the pedal lever in the usual manner, whereupon the spring 88, assisted by the ever existing atmospheric pressure in the chamber 90, will return the valve 72 to its normal off position. The motor chamber 53 will again be connected to the atmosphere through ports 74 and through the tube 92 and air cleaner 100. The usual return spring (not shown) in the master cylinder will return the power lever to its normal off position, and as soon as the reaction from the master cylinder against the rocker 30 diminishes to the proper point, the spring 37 will return the rocker 30 to the normal off position shown in Figure 1. The return spring 104 in the motor returns the head 50 to its off position and movement of such head to off position is limited by the bumper 99 carried by and forming in effect a part of the air cleaner housing 98. This bumper being of resilient material also silences contact between the parts when the off position referred to is reached.

The tube 92 permits the air cleaner to be arranged forwardly of the fire wall 10, thus silencing the rush of air into the motor when the brakes are released. The tube 92, being fixed with respect to the motor head 50 and valve housing 55 and associated elements, maintains the proper position of the motor head against sagging to a position with its axis sloping downwardly toward the head 43. Such sagging otherwise would be permitted because of the flexibility of the bellows 51.

From the foregoing it will be apparent that the present invention eliminates the lumpy operation occurring in a mechanism of this kind where it is necessary for the operator, through pressure on the pedal pad to initiate movement of the master cylinder plunger. It also will be apparent that such lumpiness is eliminated through the use of the rocker 30 which is relatively independently movable with respect to the pedal lever during initial operation thereof. Such advantageous use of the rocker 30, however, has the disadvantage stated above of providing insufficient resistance to initial movement of the brake pedal up to the point where the finger 35 contacts the rivet 27, at which point pedal resistances increase rather abruptly. With the present construction, during movement of the brake pedal from its fully off position up to the point where engagement of the finger 35 with the rivet 27 takes place, a progressively increasing elastic fluid pressure resistance reacts against the brake pedal, thus eliminating the unpleasant feeling that the pedal is falling away from the foot. At the same time, this progressively increasing resistance is not excessive and may be designed to provide any desired degree of resistance in accordance with the area of the diaphragm 84. Moreover, since the elastic fluid pressure resistance increases progressively, the point of contact of the finger 35 with the rivet 27 is unnoticed in the operation of the brake pedal instead of providing a highly objectionable sudden increase in reaction.

It is to be understood that the form of the invention herewith shown and described is to be taken as a preferred example of the same and that such changes in the shape, size and arrangement of parts may be made as do not depart from the spirit of the invention or the scope of the appended claims.

I claim:

1. A force producing device for actuating an operable member, comprising a fluid pressure motor, a power transmitting member connected to said motor to be actuated thereby, an operator operated member connected to said power transmitting member, a delayed action force transmitting element connected to said power transmitting member and said operator operated member and engaging said operable member, said operator operated member having a normal off position and said delayed action element having a normal position in which it has lost motion connection with said operator operated member for predetermined movement of said delayed action element from its normal position before engaging said operator operated member, biasing means between said power transmitting member and said delayed action element tending to hold the latter in its normal position, a valve mechanism connected to said motor and to said operator operated member and having fluid connection with a source of pressure different from the atmosphere and operable by said operator operated member in initial movement thereof from its off position to energize said motor, and reaction means connected to be operable by energization of said motor for progressively resisting movement of said operator operated member throughout movement thereof from its normal off position, said biasing means being of sufficient strength to effect movement of said operable member during initial energization of said motor until resistance to movement of said operable member increases to a predetermined point, whereupon said lost motion connection will be taken up and reaction will be directly transmitted from said operable member through said delayed action element to said operator operated member.

2. A force producing device for actuating an operable member, comprising a fluid pressure motor, a power lever connected to said motor and pivoted for turning movement on a fixed axis, a pedal lever pivoted to said power lever on a second axis spaced from said fixed axis and movable with said power lever, a valve mechanism connected to said motor and to said pedal lever and having fluid connection with a source of pressure different from the atmosphere and operable by said pedal lever in initial movement thereof from a normal off position to energize said motor, a delayed action force transmitting element connected to said power lever and connected to said operable member, means biasing said delayed action element to a normal position in which it has lost motion relative to said pedal lever when the latter is in its normal off position whereby said delayed action element is movable from its normal position through a predetermined angle of turning movement before engaging said pedal lever, and means connected to be responsive to energization of said motor for progressively opposing movement of said pedal lever from said normal off position, said biasing means being of sufficient strength to effect movement of said operable member during initial energization of said motor until resistance to movement of said operable member increases to a predetermined point, whereupon said lost motion will be taken up and reaction will be directly transmitted from said operable member through said delayed action element to said pedal lever.

3. A force producing device for actuating an operable member, comprising a fluid pressure motor having a pressure movable head one side of which is open to the atmosphere and at the other side of which is a variable pressure chamber, a valve mechanism connected to said motor and having fluid connection with a source of vacuum and operable for connecting said chamber to said source, a power lever mounted for turning movement on a fixed axis and connected at a point spaced from such axis with said movable motor head, a pivot pin carried by said power lever between said fixed axis and said motor, a pedal lever connected to said pivot pin and having connection with said valve mechanism for operating the latter upon movement of said pedal lever from a normal off position, a rocker mounted on said pivot pin and having mechanical connection with said operable member between said pivot pin and said motor, means biasing said rocker to a normal position in which it has lost motion connection with said pedal lever when the latter is in its normal position whereby said rocker is movable from its normal position through a predetermined angle of turning movement about said pivot pin independently of said pedal lever, and reaction means connected to be subject to energization of said motor to increasingly oppose movement of said pedal lever from its normal off position, said biasing means being of sufficient strength to effect movement of said operable member during initial energization of said motor until resistance to movement of said operable member increases to a predetermined point, whereupon said lost motion connection will be taken up and reaction will be directly transmitted from said operable member through said rocker to said pedal lever.

4. A force producing device for actuating an operable member, comprising a fluid pressure motor having a stationary head, a movable head spaced therefrom, and a bellows connecting said heads and defining therewith a variable pressure chamber, a valve mechanism carried by said movable head and having fluid connection with a source of vacuum and being arranged to control connection of said variable pressure chamber to the atmosphere and said source, a power transmitting member connected to said movable head, an operator operated member connected to said force transmitting member, a delayed action force transmitting element connected to said power transmitting member and engaging said operable member, said delayed action element having a normal position in which it has lost motion connection with said operator operated member when the latter is in a normal off position whereby said force transmitting element is movable in a predetermined range of movement from its normal position to a point where it engages said operator operated member, biasing means between said power transmitting member and said delayed action element tending to hold the latter in its normal position, said operator operated member being connected to said valve mechanism to operate the latter and initiate communication between said motor chamber and said source at the beginning of said range of movement, and reaction means having mechanical connection with said operator operated member and connected to be operable by a drop in pressure in said motor chamber for increasingly resisting movement of said operator operated member, said biasing means being of sufficient strength to effect movement of said operable member during initial energization of said motor until resistance to movement of said operable member increases to a predetermined point, whereupon said lost motion connection will be taken up and reaction will be directly transmitted from said operable member through said force transmitting element to said operator operated member.

5. A force producing device for actuating an operable member, comprising a fluid pressure motor having a stationary head, a movable head spaced therefrom and a bellows connecting said heads and forming therewith a variable pressure motor chamber, a valve mechanism carried by said movable head and having fluid connection with a source of vacuum and said motor chamber, a power lever connected to said movable head, a pedal lever connected to said power lever and having mechanical engagement with said valve mechanism to operate the latter and connect said chamber to said source upon movement of said pedal lever from a normal off position, a delayed action force transmitting element movably supported with respect to both of said levers and connected to said operable member, means biasing said delayed action element to a normal position in which it has lost motion connection with said pedal lever when the latter is in its normal off position whereby said delayed action element is movable from its normal position independently of said pedal lever through a predetermined range of movement, and a reaction diaphragm connected between said movable head and said valve mechanism, said diaphragm having one face exposed to the atmosphere and its other face exposed to pressure in said motor chamber to react against said pedal lever immediately upon initial energization of said motor, said biasing means being of sufficient strength to effect movement of said operable member during initial energization of said motor until resistance to movement of said operable member increases to a predetermined point, whereupon said lost motion connection will be taken up and reaction will be directly transmitted from said operable member through said delayed action element to said pedal lever.

References Cited in the file of this patent

UNITED STATES PATENTS 1,878,944   Lombard _____ Sept. 20, 1932